Patented Sept. 6, 1932

1,876,491

UNITED STATES PATENT OFFICE

JOHN P. FOSTER, OF PAIA, TERRITORY OF HAWAII

METHOD OF TREATING SUGAR JUICES

No Drawing.   Application filed June 2, 1930.   Serial No. 459,023.

The invention relates to the purification of sugar juices obtained from sugar cane, beet sugar or similar sources and has for its object to provide a process of separating insoluble compounds from an alkaline sugar juice which has been brought to a hydrogen ion concentration compatible in the presence of uncombined sugars in the solution, but incompatible in the presence of uncombined non-sugars of the type which form compounds with the alkali forming metals.

There are several well known methods in use for purifying and decolorizing sugar juices based upon the use of lime in greater or less amount. When the amount of lime applied is sufficient only to approximately neutralize the natural acidity of the juice, the process is known as "defecation", and results in a limited degree of purification and decolorization. When referred to hydrogen ion concentration, (the symbol for which is "pH"), the practical limit in the amount of lime which can be allowed to remain in the final stages of sugar manufacture prior to crystallization, is approximately pH 7.0, for reasons well known to those skilled in the art. Where a more intense degree of purification and decolorization is required than may be obtained by "defecation", the amount of lime is very greatly increased in order to obtain a greater elimination of impurities, then the excess of lime above approximately 7.0 pH, is removed by various means. Carbon dioxide ($CO_2$) may be used, in which case the lime is precipitated as calcium carbonate, and the process is known as "carbonatation" or "carbonation". Sulphur dioxide ($SO_2$) may be used for the precipitation of the lime, in which case the process is known as "sulphitation", or, a combination of the two processes may be used.

However, the lime forms very unstable compounds with some of the constituents of the sugar juices, and unless a relatively high concentration of hydrogen ion is maintained, the lime compounds disintegrate. Therefore, as the alkalinity decreases, disassociation of the lime combination takes place, and many of the juice constituents return to solution again, thus in part defeating the purpose for which the lime was used.

Thus, a lime-sugar combination known as saccharate, is broken up when the alkalinity is reduced to pH 11.0 ± and the sugar becomes soluble; a lime-glucose combination is broken up when the alkalinity is further reduced to pH 9.8 ± and the glucose, if any be present, becomes soluble and returns to solution. Very complex lime-iron combinations are broken up when the alkalinity is further reduced to pH 9.6 or less, and when the alkalinity is reduced to pH 8.5±, the various lime organic compounds are very rapidly broken up, a large amount of matter previously precipitated becomes again soluble, and the purity of the solution is decreased, also, as various combinations disintegrate, colloidal matter increases and renders the solution much more difficult of filtration or decantation.

Yet, because of the fact that the alkalinity must be reduced to approximately neutrality, the practice in the past has been to continue the acidulation of the juice until a large disintegration and re-solution has taken place, as above described, to the detriment of the further processing of the juice. Although it has been known, in a general way, that this process of disassociation and reassociation takes place, the conventional procedure nevertheless has been to acidulate to a degree of alkalinity below that at which the disassociation and re-association takes place. There have been several reasons for this:

1st. Attempts have been made in the past to determine the exact points in the acidulation process at which the various stages of disassociation and re-association occur. The effort was made by means of determining the degrees of alkalinity by titrating against a standardized acid solution. It was found that there was little or no relationship between alkalinity and the reactions occurring in the juice, and that the reactions might, and probably would, occur at widely varying degrees of alkalinity. Therefore there has been in the past no exact means of controlling the reactions, and, in order to estimate the progress of the reactions, recourse was had to various phenomena, such as the degree of flocculation in the liquid, or its viscosity, or the appearance and character of the foam, etc.

2nd. The lime forms more or less insoluble compounds with the sugar, and, lacking an exact means of controlling the reactions, it has been necessary to continue the acidulation to a point where it is certain that no insoluble compounds of the lime and sugar can remain.

3rd. Filtration of juice containing these lime compounds is attended with such difficulty as to render it, economically speaking, impossible of accomplishment, even if an exact means of controlling the reactions had been known.

I have found, however, that the disassociation of the various combinations of lime with juice constituents is a function of hydrogen ion concentration, not of degrees of alkalinity. A hydrogen ion is an atom of hydrogen bearing a charge of positive electricity, and the hydrogen ion concentration is the weight of the ions expressed as grams per liter of solution. Therefore, by determining and controlling the pH of the juice, the reactions occurring between the lime and the juice constituents may be known and controlled with an exactitude not previously possible. In accordance with this exact knowledge, I have found that I may continue the acidulation to any predetermined degree of hydrogen ion concentration at which desirable reactions occur, and/or interrupt the acidulation at any predetermined degree of pH at which undesirable reactions occur. I have further found that, by interrupting the acidulation at a degree of pH concentration prior to that at which undesirable insoluble compounds are rendered soluble and thereby returned to solution, I may remove these compounds while they are yet insoluble, and thereafter continue the acidulation to any desired degree of pH concentration, and avoid the contamination of the juice which would have taken place had the undesirable compounds not been removed at a higher degree of pH concentration.

I have further found that the juices, while still at a degree of pH concentration which renders them exceedingly difficult of filtration by conventional means, may be worked in a centrifugal machine of the cream separator type, and the insoluble compounds removed by specific gravity differentiation, in a manner well known to those skilled in the art.

I use the term "lime" in its generic sense, and I may use lime in its caustic form, or as a hydrate, or as dry lime or as milk of lime, and I may use any of the various alkalies, as calcium, sodium, potassium, magnesium, barium, strontium, etc., in the forms in which they are known and used in the treatment of sugar juices, these alkalies being generically designated as alkali-forming metals.

I use the term "juice" in its generic sense, without regard to the origin of the juice, that is to say, it may be the juice of sugar cane, or the juice of sugar beets, or a synthetic juice formed by a solution of sugar crystals. I use the term "juice" also without regard to its concentration, that is to say, the juice may be "thin juice" or "thick juice" in the sense in which these terms are commonly used in the sugar industry.

I use the term "acidulation" in the sense of any means which may be employed to increase hydrogen ion concentration to decrease the pH value in the juice. I may employ carbon dioxide, sulphur dioxide, phosphoric acid. I may employ a liquid or a gaseous acidulating agent, or I may employ an electric current passing through the juice.

In the removal of the insoluble matter from the juice, I may employ any means of effecting a separation between the liquid and the insoluble matter, that is to say, I may employ sedimentation, decantation, filtration, centrifugaling, or any other separatory process which might reasonably be used by those skilled in the art.

In carrying out my process for the purification and decolorization of sugar juices, I proceed as follows:

To the juice to be treated, I add lime in the approximate proportion of 1 to 1.5% (calculated as CaO) by weight on the weight of the organic non-sugars present, being careful to avoid temperatures in excess of 50° C. After thorough admixture, I start the acidulation and continue it until the hydrogen ion concentration is pH 11.0 or slightly less. At this point, the calcium saccharates are disintegrated and the sucrose released from combination.

If glucose be present (as in cane sugar juices), I may or may not wish to release the glucose from its combinations; if I desire to release glucose, I continue acidulation to pH 9.8 at which point the glucose is all released from calcium combination.

If, on the other hand, I wish to exclude glucose from the solution, I stop the acidulation at approximately pH 10.5, at which pH concentration the glucose remains in calcium combination. Therefore, the acidulation is stopped at pH 10.5 to 11.0, if glucose is to be excluded from the solution, and the insoluble precipitate removed by any suitable means, as before mentioned.

In the case of juices in which no glucose is present, (as in beet juice), the acidulation may be stopped at slightly below pH 11.0, so as to make certain that all sucrose has been released from calcium combination, and the insoluble precipitate then removed. In no case should the acidulation be permitted to proceed as far as pH 9.6, as, in that case, the highly colored ferric iron salts will be released, resulting in a strongly colored solution. After the removal of the insoluble precipitate, the acidulation is resumed and proceeds to approximately pH 6.9 at which pH concentration the juice may be readily filtered, and the precipitate of calcium carbonate removed.

The juices may be then concentrated to crystallization in the usual manner.

The advantages of this procedure are very pronounced. Ferric iron is excluded from solution, and other coloring matter, of which anthocyan is a type, is likewise removed in insoluble form, resulting in a much lighter colored juice than would otherwise be possible.

Organic non-sugars which are released into solution at pH 8.5 ±, are removed in insoluble form, resulting in a juice of higher purity than would otherwise be possible. A very pronounced saving in acid is also effected because of the fact that acid would otherwise be required to effect the neutralization of the calcium which is progressively released from combination at decreasing pH concentrations. When the calcium is removed in the form of insoluble organic combinations, acid which would otherwise be required to form calcium carbonate is not used.

What I claim is:

1. In the purification of sugar juices, the steps which comprise acidulating an alkaline sugar juice containing alkali-forming metal compounds of sugars and non-sugars, to a degree sufficient to substantially completely dissociate said sugar compounds and return sugar to the solution, but insufficient to dissociate said non-sugar compounds, and then separating said non-sugar compounds from the sugar solution.

2. In the purification of sugar juices, the steps which comprise acidulating an alkaline sugar juice containing alkali-forming metal compounds of sugars and non-sugars to a degree sufficient to substantially completely dissociate said sugar compounds and return sugar to the solution but insufficient to dissociate said non-sugar compounds, separating the insoluble non-sugar compounds from the sugar solution, and continuing the acidulation until a solution suitable for concentration and crystallization of the sugar therein is obtained.

3. In the purification of sugar juices, the steps which comprise acidulating an alkaline sugar juice containing alkali-forming metal compounds of sugars and non-sugars until the pH value is approximately 9.8 to 11 but is in excess of any value of which said non-sugar compounds dissociate with the liberation of non-sugars, then separating said non-sugar compounds from the solution.

4. In the purification of sugar juices, the steps which comprise acidulating an alkaline sugar juice containing alkali-forming metal compounds of sugars and non-sugars until the pH value is approximately 9.8 to 11 but is in excess of any value at which said non-sugar compounds dissociate with the liberation of non-sugars, separating said non-sugar compounds from the solution, and continuing the acidulation until a solution having a pH value suitable for concentration and crystallization is obtained.

5. In the purification of sugar juices, the step which comprises separating insoluble compounds from an alkaline sugar juice having a pH value of approximately 9.8 to 11 but in excess of any value compatible with the presence of uncombined non-sugars of the type which form compounds with alkali-forming metals.

6. The process of purifying sugar juices to remove non-sugars therefrom which comprises liming the juices to form calcium compounds of sugars and non-sugars, acidulating the solution until the pH value thereof is decreased to that at which desired sugars are substantially completely returned to the solution as a result of the dissociation of their calcium compounds, said value being in excess of that at which the calcium compounds of the non-sugars dissociate, and then separating said non-sugar compounds from the solution.

7. The process of purifying sugar juices to remove non-sugars therefrom which comprises liming the juices to form calcium compounds of sugars and non-sugars, acidulating the solution until the pH value thereof lies between 9.8 and 11 but is in excess of that of which the calcium compounds of the non-sugars dissociate and then separating said non-sugar compounds from the solution.

8. In the purification of sugar juices, the method of separating glucose from sacchrose which comprises acidulating a solution containing calcium compounds of glucose and sacchrose until the pH value thereof is about 10.5 to 11 but is in excess of that at which glucose is liberated from its calcium compound and then separating the glucose compound from the solution.

In testimony whereof I affix my signature.

JOHN P. FOSTER.